L. K. SCOTFORD.
NUMBERING MACHINE.
APPLICATION FILED OCT. 7, 1910.
1,145,085.
Patented July 6, 1915.
5 SHEETS—SHEET 5.
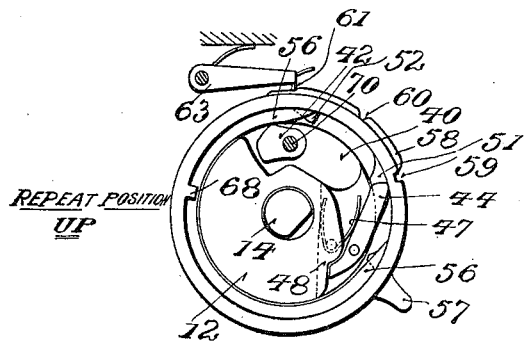
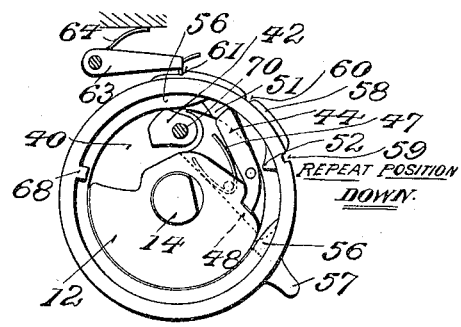
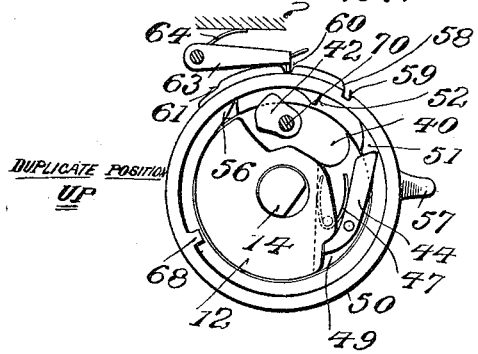
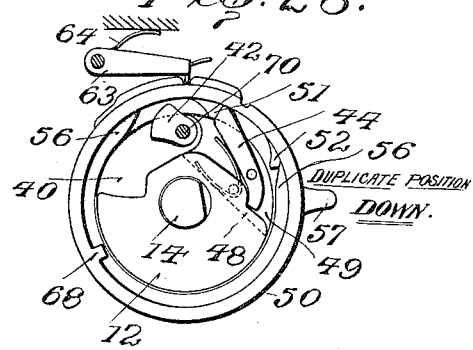
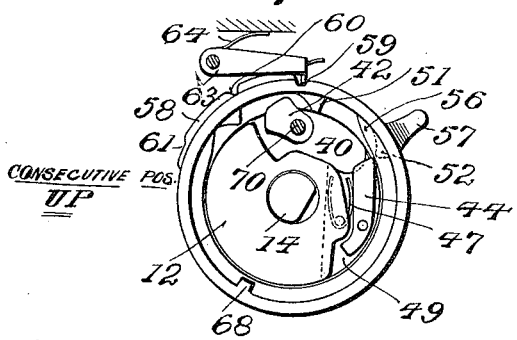
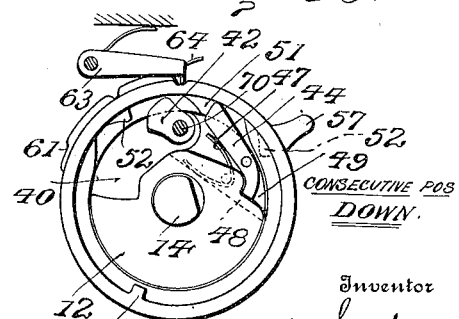
Witnesses
W. A. Williams
H. S. Smilie
Inventor
Louis K. Scotford
By Robertson & Johnson
Attorneys

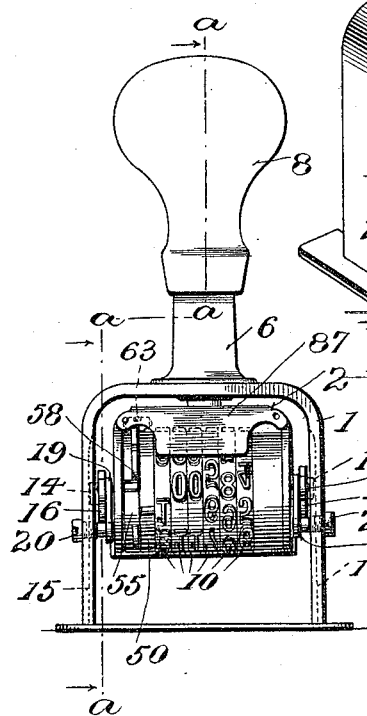
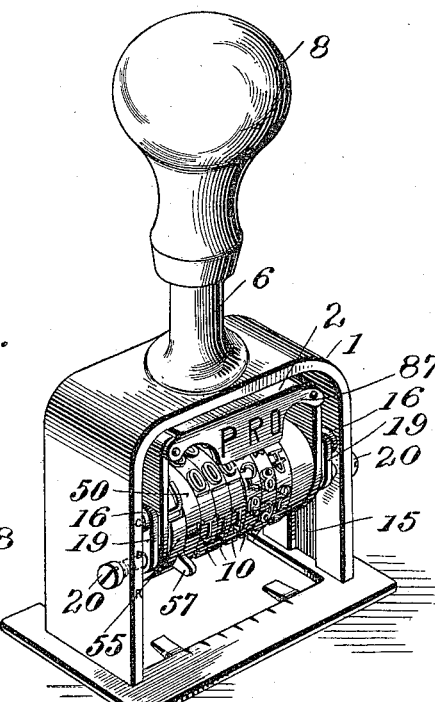
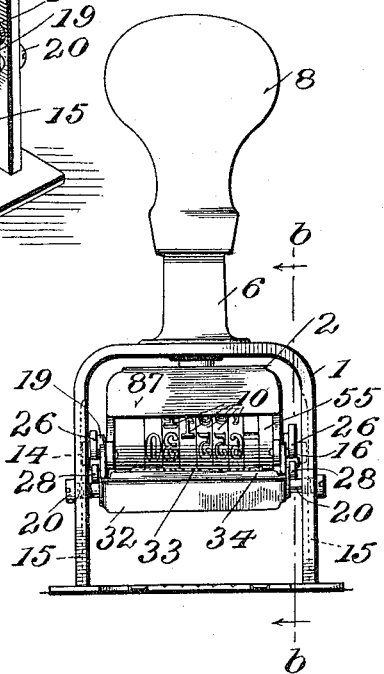

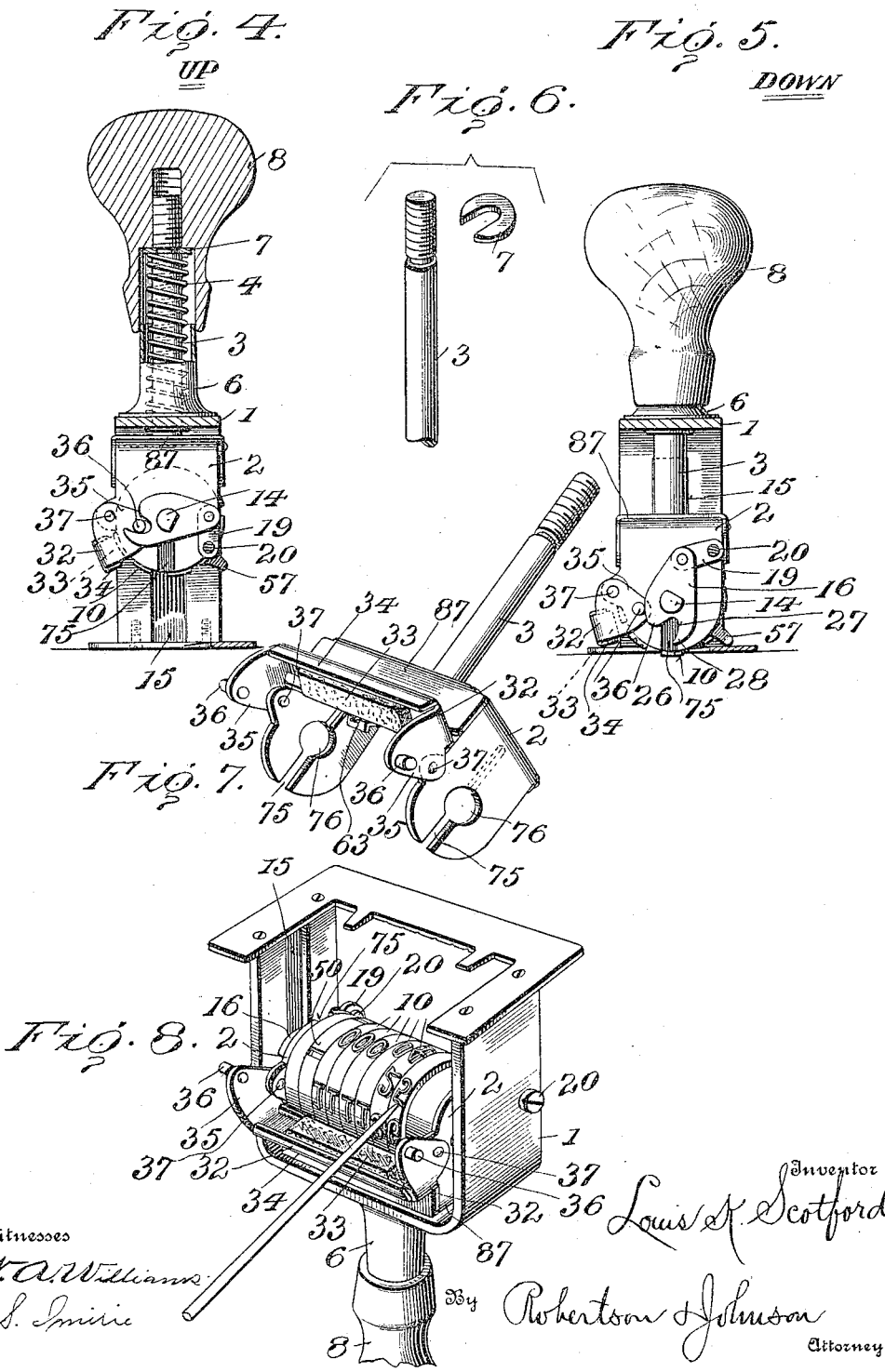

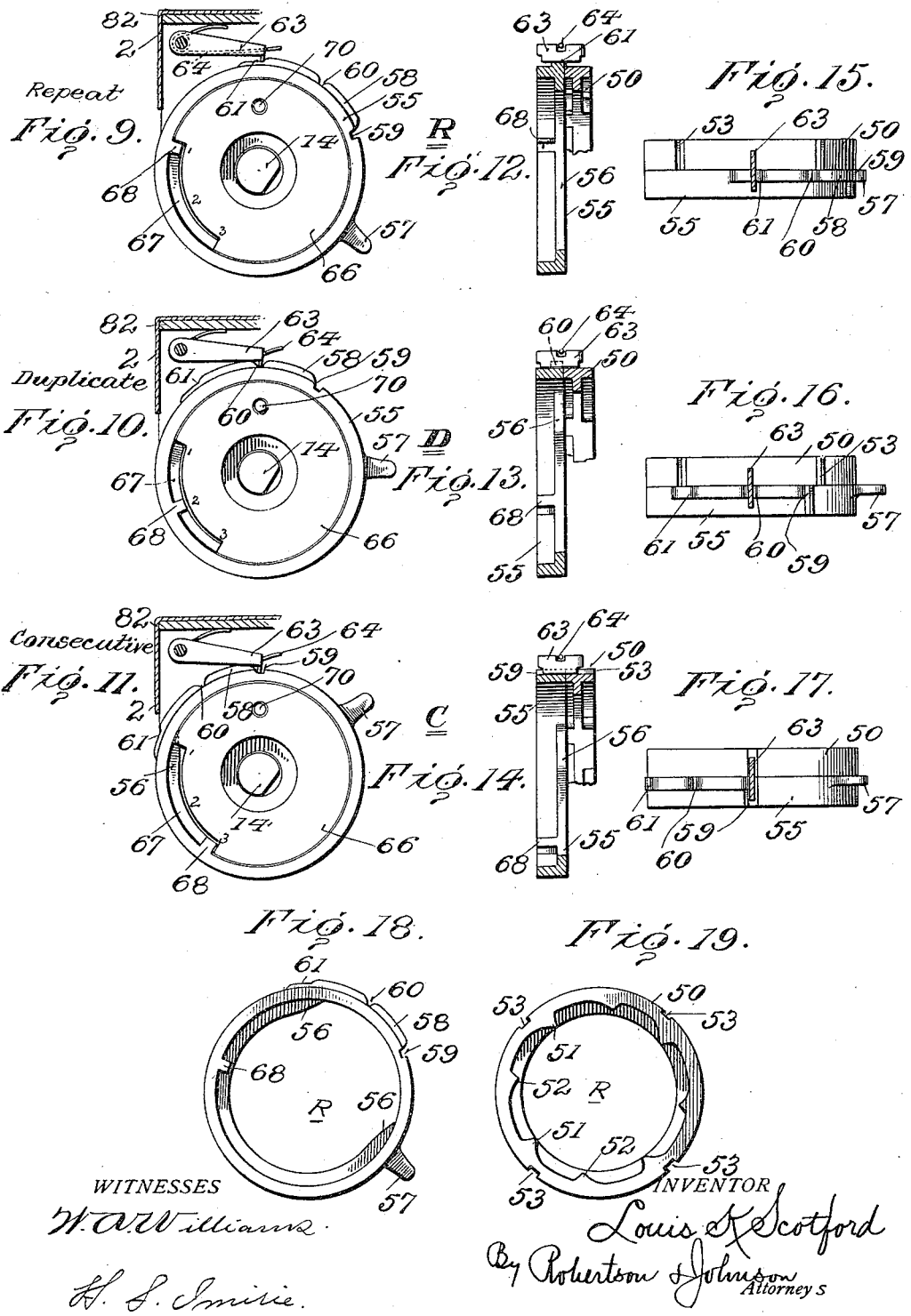

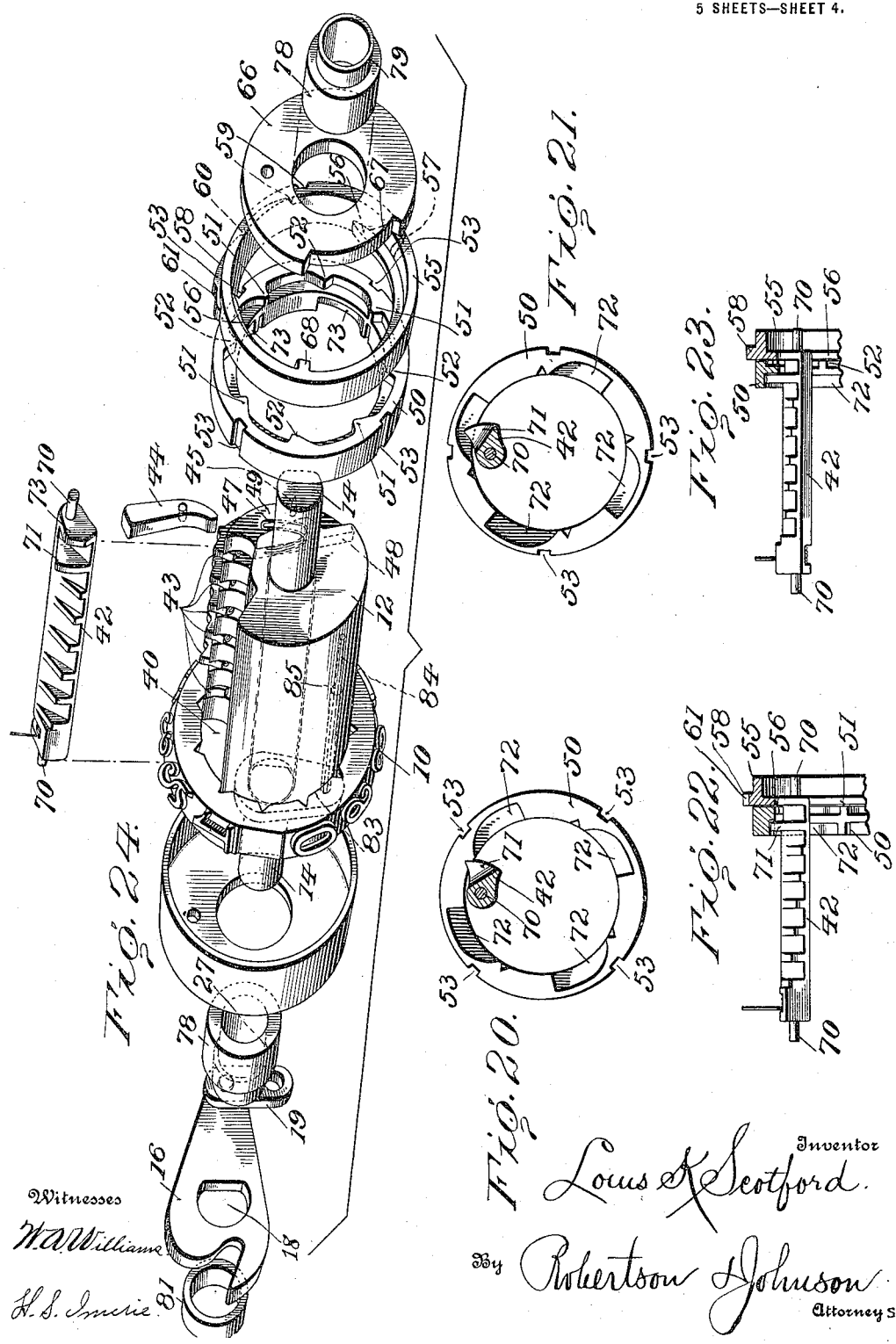

UNITED STATES PATENT OFFICE.

LOUIS K. SCOTFORD, OF CHICAGO, ILLINOIS, ASSIGNOR TO BATES MANUFACTURING COMPANY, OF NEW YORK, N. Y., A CORPORATION OF NEW YORK.

NUMBERING-MACHINE.

1,145,085.  Specification of Letters Patent.   Patented July 6, 1915.

Application filed October 7, 1910. Serial No. 585,755.

*To all whom it may concern:*

Be it known that I, LOUIS K. SCOTFORD, of Chicago, in the county of Cook and State of Illinois, have invented certain new and useful Improvements in Numbering-Machines, of which the following is a specification.

This invention relates to that class of numbering machines which are "automatic" in their action, and which are usually made so that they may be "set" in order to permit a user to print numbers consecutively or successively, or to "duplicate" the printing of the same number before the machine automatically changes the units-wheel, or to "repeat" by printing the same number over and over again, as many times as may be desired.

The object of my invention is to make a machine of the type broadly covered in my United States Patent No. 815,124 granted March 13, 1906, which will be much simpler in construction than the machine of said patent, and yet which will have the same advantages and operate, so far as its interior mechanism is concerned, in substantially the same way. In the present invention, in its preferred embodiment, I do away with the levers of the aforesaid patent, and control the operation of the parts by means of a "duplicator" of annular form and rotatably mounted combined with a governor also of annular form and rotatably mounted, and these co-acting with a pawl, control the action of the numbering wheels.

Another object of my invention is to provide an improved inking pad frame, which in its preferable form is made of sheet metal and which may be swung back for inking without adjusting any of the parts and which, by gravity, will swing back into position to be engaged by its operating parts.

Reference should be made to the claims wherein the scope of the invention is set forth.

In the drawings accompanying and forming part hereof, and which it will be understood represent the preferable though not the necessary, embodiment of my invention: Figure 1 is a perspective view of a machine constructed in accordance with my invention. Fig. 2 is a front elevation of the same. Fig. 3 is a rear elevation. Fig. 4 is a vertical section on the line *a a* of Fig. 2. Fig. 5 is a section on the line *b b* in Fig. 3 but with the parts in the printing position. Fig. 6 is a perspective detail. Fig. 7 is a perspective view of the wheel frame and the ink pad detached from the machine. Fig. 8 is an inverted view in perspective of the machine with the ink pad thrown back showing the machine in the position for adjustment of the wheels. Figs. 9, 10, and 11 are details of the governor, and co-acting parts. Figs. 12, 13, and 14 are sections of the governor and co-acting parts. Figs. 15, 16, and 17 are top plan views of the governor and duplicator ring.
Fig. 18 is a side elevation of a governor. Fig. 19 is a side elevation of a duplicator ring. Figs. 20 and 21 are views of the duplicator ring from the opposite side to that shown in Fig. 19. Figs. 22 and 23 are details showing the stepped pawls and the governor and duplicator ring. Fig. 24 is a perspective view of the barrel, its detents, one numbering wheel, the stepped pawls, and operating parts, all detached in order to show better their construction. Figs. 25 and 26 are details showing the parts in the "repeating" position, or at "R." Figs. 27 and 28 are details showing the parts in the "duplicating" position, or at "D." Figs. 29 and 30 are details showing the parts in the "consecutive" position, or at "C."

Referring now to the details of the drawings by numerals: 1 indicates the main frame which may be made of the usual or any desired construction and in which operates the ordinary or any approved style of wheel frame or yoke 2, from which yoke projects upwardly the ordinary spindle 3, around which is located the spring 4, operating within a tubular extension 6 of the main frame 1, the spring being held to the spindle 3 by means of a U-shaped washer 7 (see Fig. 6) and the upper part of the spindle 3, its spring 4, and washer 7 all being inclosed by the handle 8 which is screwed on to the upper end of the spindle 3. It will be understood that all of these parts may be made of any approved construction and that those shown are merely typical of what is old. In fact nothing is claimed as new in the parts so far described, and further description of them is therefore unnecessary.

The aforesaid wheel frame or yoke 2, as its name implies, carries a series of numbering "wheels" 10, which are rotatably carried upon a support or barrel 12. This barrel 12 is substantially like that shown in my aforesaid Patent No. 815,124 and has an axle pin forming trunnions 14, which project through the sides of the wheel frame or yoke 2 and enter and are capable of vertical movement within the vertical grooves 15 of the main frame 1. In order to give rotary or oscillatory movement to the barrel 12 and its numbering wheels 10, I employ cams 16, one on each side of the yoke 2, which are provided with D-shaped apertures 18 which fit over the ends of the trunnions 14 which are similarly shaped in order to compel the trunnions and their barrel to oscillate whenever said cams oscillate. The cams are caused to oscillate by means of short links 19 which are pivoted to the cams 16, and in turn are pivoted to screw-studs 20 which project inward from the main frame 1. When the head is given vertical reciprocation by pressing down the handle 8, the said cams 16 are moved downward to a similar extent and are simultaneously slightly turned on their axes, owing to the fact that their ends are connected to the studs 20 by the links 19, and as the cams 16 are fast on the trunnions 14, said trunnions and their barrel 12 and its connected parts are also turned on their axes. Thus the parts are oscillated on their axes on the downward movement from the inking plane to the printing plane, and as soon as the operator removes pressure from the handle 8, its spring 4 forces the parts upward and the reverse of the action just described takes place, and the wheels are oscillated back from the printing plane to the inking plane.

The inking pad is also of novel construction and like the numbering head and the wheels, it is operated by the vertical movement of the trunnions 14, through the medium of the aforesaid cams 16. To this end I form said cams 16 with cam humps 26, recesses 27, and projections 28, coöperating with the inking pad frame as will be described. The said inking pad frame 32 is preferably made of one piece of sheet metal to form a housing for the pad 33, the said frame having two longitudinal flanges 34 to retain the pad 33 and two end flanges having projecting studs 36. This simple pad frame 32 is pivoted on two studs 37 projecting from the sides of the yoke 2 and the parts are so formed and hung from these studs 37 that when the machine is held in a vertical position, the frame 32 will hang substantially vertically with the studs 36 pointing inward, (see Figs. 4 and 5). They are thus in the proper position to project into the recesses 27 of the cams 16, and any movement of the cams 16 causes a movement of the pad frame and its pad. Thus, when the machine is in normal position, the spring 4 is pressing the handle and all of its connected parts upward, including the cams 16, whose recesses 27 and points 28 therefore strongly press against the studs 36 of the ink pad frame and press the ink pad 33 against the numbering wheels. When, however, the operator presses downward the handle 8, the wheel frame or yoke is also moved downward, and the cams 16 given a slight rotation. This rotation causes the cam-humps 26 to press against the studs 36 of the ink pad frame and push the latter away, thus moving the ink pad on its pivots 37 away from the numbering wheels (see Fig. 5). After the impression is made, the operator permits the handle 8 to ascend and this upward movement of the numbering head and its cams, causes the proper oscillation of the numbering wheels as before described, and as the cams 16 turn on their axes, the points 28 co-act with the studs 36 on the ink pad frame and the further upward movement of the head swings said pad frame on its pivots so as to press the ink pad into inking contact with the numbering wheels. It will thus be seen that I have been able to construct an inking pad frame which is made preferably of one piece of metal and which is operated directly by the cams which operate the numbering wheels and without the aid even of links which are usually used to connect the pad frame to the yoke or wheel frame. The parts are also so constructed that when the machine is inverted as shown in Fig. 8, and the head pressed slightly, the cams 16 will move to such positions that the inking pad frame will, by gravity, be caused to disengage from said cams and fall to the position shown in said Fig. 8. Yet, when the machine is turned to its proper position, the inking pad will again assume its proper position to cause the cams to engage the pad frame and again press it into inking position. I deem this important.

To return now to the means for imparting movement to the numbering wheels, it may be well to state again that my present machine employs a barrel or drum 12 preferably like that shown in my aforesaid Patent No. 815,124 and that this barrel 12 has a longitudinal recess 40 within which is located the stepped pawls 42, and that these parts operate in the manner broadly covered in my aforesaid patent, to wit: the stepped pawl has no rotary movement with respect to the numbering wheels and is merely capable of a very slight movement on its own axis, while the barrel has an oscillation on its axis (the trunnions 14); and the barrel and its numbering "wheels" (which I may here state are merely rings) are oscillated by the aforesaid cams from the inking plane to the printing plane and backward from the printing plane to the inking plane, the wheels co-acting with said stepped pawls as the wheels move in one direction or the other; the pawl during the upward reciprocation engaging the teeth of the unit wheel and holding it back as the other wheels continue their movement. Inasmuch as the pawl, the numering wheels, and the barrel 12 are, with slight exceptions to be noted, like those of the aforesaid patent, reference may be made to said patent for the general arrangement and operation of said parts.

The novelty resides more particularly with the means for controlling or governing the action of the numbering wheels and the stepped pawl, and such means will now be described.

In addition to the spring acting detents 43 which control the position of the numbering wheels 10 on the barrel 12 and which permit said wheels to move around said barrel in one direction and prevent movement in the reverse direction, I employ an independent detent 44 which is pivoted on the same pin 45 to which all the detents 43 are pivoted, and this main detent 44 is provided with a spring 47 acting within a recess 48 in the barrel 12 to force the larger end of the detent away from said barrel. The barrel 12, it will be seen, has a recess 49 within which the detent 44 is located and within which it works. This detent 44 is adapted to co-act with a duplicator ring 50 which is located alongside of the numbering wheel farthest removed from the unit wheel. The interior surface of this duplicator ring (which I shall in some of my claims refer to as the "duplicator") is provided with eight projections or teeth 51 and 52 on the interior and with four grooves 53 on the exterior, and it is to be noted that the teeth 51 project farther inward than do the teeth 52 (see Fig. 19). The purpose of this will be stated later.

Alongside of the duplicator ring 50 is a governor 55 which also is novel. This governor is journaled on the disk 66 to be hereinafter referred to and has a flange each of whose ends acts as a cam 56 as will be described. The governor also is provided with a handle 57 by which it may be regulated or moved on the barrel and it furthermore has an exterior rib 58 and a groove 59; the rib also having a notch 60 which does not go below the level of the exterior surface of the governor and also with a portion 61 only slightly raised which acts as a step below the rib 58. The rib 58, its notch 60 and step 61, as well as the groove 59, in the governor; and the grooves 53 of the duplicator ring 50 all co-act with a spring-actuated exterior pawl 63 which is pivoted to the wall of the wheel frame or yoke 2 and has a spring 64 to hold it in the desired place. The pawl 63 is broad enough to engage, at the same time, the exterior surfaces of both the governor and duplicator ring. It will be observed that the parts are so constructed and located that when the pawl 63 rests in the groove 59 of the governor, said pawl is allowed by the depth of said groove to engage also with one of the grooves 53 of the duplicator ring, and thus lock the duplicator ring and governor together (see Figs. 11, 14 and 17). When, however, the governor is moved by the operator engaging the handle 57 and rotating said handle and governor, the latter is moved so that the pawl 63 engages either the shallow notch 60 or the step 61. When the pawl is in the shallow notch 60, (see Figs. 10, 13, and 16) the depth of said notch is insufficient to permit the pawl to descend into any of the grooves 53, and hence the duplicator ring may now be moved independently of the governor instead of being locked to it. The step 61 also holds the pawl 63 away from the grooves in the duplicator ring and permits the latter to move independently of the governor (see Figs. 9, 12, and 15). These three places, the groove 59, the notch 60 and the step 61, when co-acting with the exterior pawl 63 define the limits of movements of the governor, and to insure no further movement of the governor with respect to said pawl, and at the same time to give it a better bearing than it can have on the barrel with its recess 49 and the cam 56 with its gap, I employ a washer or filler 66. This washer or filler has a recess 67 in its periphery which co-acts with a lug 68 projecting from the governor. Since the washer or filler 66 has no rotary movement on the trunnion, its recess 67 co-acting with the lug 68 limits the movement of the governor, and the length of the recess 67 is just sufficient to permit the governor to be moved a distance corresponding to the distance between the groove 59 and the step 61. This washer or filler 66 also serves to support the pin 70 on which the stepped pawl 42 is pivoted.

The washer 66, the pin 70, and the stepped pawl 42 have no rotary movement, but only a reciprocating vertical movement as all the parts move up and down in the main frame, except that the stepped pawl has, as before described, a slight oscillatory movement on the pin 70 from the position shown in Fig. 25 to that shown in Fig. 27. The stepped pawl 42 in addition to having the stepped pawls like those shown in my aforesaid patent, also has a step or part 71 which is so formed and located as to engage with the four deep recesses 72 on the back of the duplicator or ring 50 (see Figs. 20 and 21), and also a step or part 73 to be engaged by one of the cams 56 projecting inward from the governor 55, so that when said governor is moved to the position shown in Figs. 25 and 26, the stepped pawls are held downward so that they cannot engage with any of the numbering wheels, and then said wheels are not changed in sequence. At this time it may also be stated that when the governor is so moved that the other of its cams 56 is opposite the detent 44, said detent is held inward by said cam as shown in Fig. 29, and when so held, it is withdrawn to a point where it cannot engage the shallow teeth 52 of the duplicator cam and yet projects sufficiently to engage the deeper teeth 51. It will be seen from Figs. 20 to 23 that when the parts are set so that the duplicator is moved at each reciprocation of the handle, the step or part 71 of the stepped pawls enters, at every other reciprocation the deep recesses 72, and during the alternate reciprocations the pawl bar is held down as seen in Fig. 20. Thus in one of the positions the stepped pawls are active and in the other position are inactive.

The means for holding the barrel and its various allied parts in the wheel frame is also new, and is as follows: The sides of the wheel frame are formed with slots 75 which have enlarged circular parts 76 and through these project the trunnions 14. But in assembling the parts, the barrel with all of its supported parts is slipped into the frame, the trunnions entering the slots 75 and when they are within the enlarged circular parts 76, bushings 78 are slipped over the trunnions 14, these bushings being of just the proper size to fit snugly within the circular openings 76. The barrel is thus locked in the said wheel frame or yoke 2, since it cannot be withdrawn until the bushings 78 are first removed. These bushings also enter the washer or filler 66 and have reduced ends 79 which project out of the wheel frame 2 forming abutments for the cams 16 to fit against. To make less friction, and to make up for the uneven shape of the D-shaped ends of the trunnions 14, antifriction washers 81 are slipped over said ends and these washers work in the aforesaid vertical groove 15 in the insides of the main frame 1.

Another feature to be described is a resilient connection between the barrel 12 and its axle. In order to prevent the action of the machine from being too rigid, I do not connect the axle and barrel firmly together, but connect them through the medium of a crank 83 which is formed on or secured to the axle and this crank is connected to the barrel 12 by means of a stiff or spring pin or rod 84, and this rod enters an opening 85 larger than itself and has its end secured in an opening of the proper size (see Fig. 24); this construction permitting the free end of the pin to bend or "give" slightly in the opening 85 and thus permit a slight spring or resilient action between it and the crank 83. By providing this resilient connection, and by having the actuating cams 16 formed or set so that they will turn the hub a little beyond what is actually necessary, I am enabled to make a machine which will always make its full stroke even when the parts are worn.

One other feature to be described is a hood 87 which is substantially U-shape in form and is made of light sheet metal, the hood fitting over the U-shaped wheel frame or yoke 2, and the sides of the U-shaped hood projecting downward so as to protect, as far as possible, the numbering wheels and the spring pawl within the yoke 2, and at the same time provide a name plate, as clearly seen in the drawings.

Having described the various parts of my machine, I will now proceed to describe the operation which is as follows: Assuming that it is desired to "repeat" or in other words to print the same number indefinitely, the handle of the governor is turned to the position shown in Fig. 1 where it is opposite the letter R on the main frame 1. The parts are now in the position shown in Fig. 25, and as there shown, it will be noticed that one of the cams 56 is so located that it holds down the stepped pawls so that these stepped pawls cannot engage any of the numbering wheels. Therefore, the said wheels will be held by their detents 43 and moved with the barrel 12 as said barrel 12 oscillates, so that the same number is printed at every reciprocation of the handle. Now if it is desired to change the machine so as to "set" it to duplicate, that is to say to print the same number twice, as 1, 1; 2, 2; 3, 3; and so on, the handle of the governor is moved so that it will be opposite the letter D on the main frame. By so moving the governor, the governor shifts from the position shown in Figs. 25 and 26 to the position shown in Figs. 27 and 28, and now it will be observed that the cams 56 of the governor have been so moved with respect to the stepped pawl bar, that said pawls are now free to engage the numbering wheels. At least they are free to engage said wheels so far as said governor is concerned, but now it is to be observed that since the stepped pawls are free to swing upward, they are controlled in their movements by the duplicator ring 50 and as this duplicator ring has on its rear side four deep notches 72 which notches permit the stepped pawls to engage with the numbering wheels only when the step 71 is in the notch 72, it will be obvious that, at every other reciprocation, the stepped pawls can engage the numbering wheels and at the alternate reciprocations the stepped pawls are held by the duplicator ring out of contact with the numbering wheels; the result being that the numbering wheels are changed by the stepped pawls at every other reciproccation, thus printing the same number twice. Now if it is desired to print the numbers consecutively, the handle on the governor is moved opposite the letter C of the main frame. Now the parts are moved from the position shown in Figs. 27 and 28 to position shown in Figs. 29 and 30. In this position the exterior pawl 63 engages not only the governor but also the duplicator ring as illustrated in Figs. 14 and 17 and hence said duplicator ring cannot be turned. The four grooves 53 on the exterior of this duplicator ring are so located that when the exterior pawl 63 is engaging any one of the grooves, the stepped pawl 71 is in such a position that it fits any one of the four recesses 72 of the duplicator ring, and as it will be remembered that this duplicator ring is held stationary, it follows that the stepped pawls are in constant engagement with the numbering wheels. It therefore follows that as the numbering wheels are caused to oscillate with the barrel 12 the unit numbering wheel is at every reciprocation held by the stepped pawls and thus the numbers are changed consecutively in the same manner as described in my aforesaid Patent No. 815,124. In changing from one position to the other the change might be made at a time when the deep notch would not necessarily be opposite the stepped pawl bar and in order to provide for an automatic adjustment, I make the eight teeth 51, 52 on the duplicator ring as shown in Fig. 19. By comparing this figure with Fig. 30, it will be seen that if, when the change is made to print consecutively, the deep tooth 51 should be in the position where the shallow tooth 52 is located in Fig. 30, underneath the handle 57 of the governor, the detent 44 would engage said deep tooth and move it to the position shown in Fig. 30 when the deep notch 72 would be in the proper position to permit the stepped pawls to assume the position shown in Figs. 29 and 30. But on the next reciprocation the duplicator ring would not move because when the pawl 44 is oscillated back the succeeding ratchet tooth 52 is too shallow to be engaged by the stepped pawl 44 and hence said pawl 44 cannot again move the duplicator ring, or rather it could not again move the duplicator ring even if it were not locked to the governor by means of the exterior pawl 63.

From the foregoing and accompanying drawings it will be seen that I have invented a very simple form of numbering machine which can be changed by the simple adjustment of a single part and that all of the other adjustable parts are hidden from view where they cannot be tampered with. It will also be seen that I have constructed this in a machine of the compact type shown in my aforesaid patent and that with it I have produced an inking pad which by the mere action of gravity assumes the proper position after having been thrown out of inking position. While I have defined the working features and described them in the way I now prefer to make them, it is obvious that my invention is not limited to the construction shown and reference should be made to the appended claims to determine the scope of my invention.

What I claim as my invention is:—

1. In a numbering machine, a series of numbering wheels, means acting upon the interiors of the said wheels for moving the same, and a rotatable governor having substantially the same axis as said wheels and controlling the action of said moving means, the said governor having a plurality of stationary controlling positions, substantially as described.

2. In a numbering machine, a series of numbering wheels, means acting upon the interiors of the said wheels for moving the same, a rotatable governor having substantially the same axis as said wheels and controlling the action of said moving means in any one of a plurality of positions, and means for retaining the governor in any one of said positions, substantially as described.

3. In a numbering machine, a series of numbering wheels, an interior pawl coacting with said wheels and substantially non-shiftable in the direction of its axis, and a rotatable governor having substantially the same axis as the numbering wheels and controlling the action of said pawl, substantially as described.

4. In a numbering machine, a series of numbering wheels, a pawl coacting with said wheels, and an annular governor having substantially the same axis as said wheels and controlling the action of said pawl, the said governor being provided with means on its interior surface for coacting with said pawl and having a plurality of stationary controlling positions, substantially as described.

5. In a numbering machine, a series of numbering wheels, a pawl coacting with said wheels, an annular governor having substantially the same axis as said wheels and controlling the action of said pawl in any one of a plurality of positions and having means on its interior surface for coacting with said pawl, and means for retaining the governor in any one of said positions, substantially as described.

6. In a numbering machine, a series of numbering wheels, a pawl coacting with said wheels, an annular governor adjustable in position and having an interior cam coacting with said pawl and controlling the position thereof, and means for limiting the extent of movement of the governor in adjusting the same, substantially as described.

7. In a numbering machine, a series of numbering wheels, a pawl co-acting with said wheels, and a rotatable governor comprising a ring having a cam co-acting with said pawl and controlling the position of the same, and an exterior pawl co-acting with said governor to determine the position of the aforesaid pawl which co-acts with the numbering wheels, substantially as described.

8. In a numbering machine, a series of numbering wheels, a pawl, a rotatable governor comprising a ring having an interior portion coacting with said pawl, and an exterior pawl adjacent said governor, the governor having means, as notches or grooves, coacting with said exterior pawl, whereby the governor is held in certain positions of adjustment, substantially as described.

9. In a numbering machine, a series of numbering wheels, an interior pawl coacting with said wheels, a governor comprising a ring having an interior cam co-acting with said interior pawl to control the position of the same, and an exterior pawl co-acting with the exterior of said ring to maintain the same in certain stationary positions of adjustment, substantially as described.

10. In a numbering machine, a series of numbering wheels, an interior pawl coacting with said wheels, a governor comprising a ring having an interior cam co-acting with said interior pawl to control the position of the same, an exterior pawl co-acting with the exterior of said ring to maintain the same in certain positions of adjustment, and a finger projecting from said ring by which it may be adjusted readily, substantially as described.

11. In a numbering machine, a series of numbering wheels, an interior pawl coacting with said wheels, a governor comprising a ring having an interior cam coacting with said interior pawl to control the position of the same, an exterior pawl coacting with the exterior of said ring to maintain the same in certain positions of adjustment, and means secured to the said governor whereby it may be readily adjusted, substantially as described.

12. In a numbering machine, a series of numbering wheels, means for oscillating said wheels on their axes from an inking plane to a printing plane and from the printing plane back to the inking plane, and a rotatable governor having substantially the same axis as the wheels and controlling the action of the same, substantially as described.

13. In a numbering machine, a series of numbering wheels, means for oscillating said wheels on their axes from an inking plane to a printing plane and from the printing plane back to the inking plane, a pawl co-acting with said wheels and a rotatable governor having substantially the same axis as the wheels and controlling the action of said pawl, substantially as described.

14. In a numbering machine, a series of numbering wheels, means for oscillating said wheels on their axes from an inking plane to a printing plane and from the printing plane back to the inking plane, a pawl coacting with said wheels, and a rotatable governor comprising a ring having substantially the same axis as the wheels and controlling the action of said pawl, substantially as described.

15. The combination of a series of numbering wheels, means for oscillating said wheels, a fixed pawl bar coacting with said wheels, and a rotatable governor having substantially the same axis as the wheels and controlling said pawl bar, substantially as described.

16. The combination of a series of numbering wheels, a pawl bar acting on the interior surfaces of said numbering wheels and having no rotary movement but a slight oscillation on its axis, and a rotatable governor having substantially the same axis as the wheels and controlling the action of said pawl bar, substantially as described.

17. The combination of a series of numbering wheels, a pawl bar acting on the interior surfaces of said numbering wheels and having no rotary movement but a slight oscillation on its axis, and a rotatable governor comprising a ring having substantially the same axis as the wheels and controlling the action of said pawl bar, substantially as described.

18. In a numbering machine, a series of numbering wheels, means for moving said wheels including a pawl, and a governor and a duplicator each comprising a ring controlling the action of said moving means, said governor and duplicator having means on their interior surfaces for coöperating with said pawl, and said governor having a plurality of stationary controlling positions, substantially as described.

19. In a numbering machine, a series of numbering wheels, a pawl coacting with the interior surfaces of said wheels, a rotatable governor having a cam coacting with said pawl and controlling the position thereof, and a duplicator ring coacting with said governor, said governor having a plurality of stationary controlling positions, substantially as described.

20. In a numbering machine, a series of numbering wheels, a pawl coacting with the interior surfaces of said wheels, a rotatable governor having a cam coacting with said pawl and controlling the position thereof, and a duplicator ring coacting with said governor and having recesses or notches permitting said pawl to coact with said wheels when said recesses are opposite said pawl, said governor having a plurality of stationary controlling positions, substantially as described.

21. In a numbering machine, a series of numbering wheels, a pawl coacting with the interiors of said wheels, a rotatable governor comprising a ring having a cam coacting with said pawl and controlling the position of the same, and a duplicator ring having recesses or notches permitting said pawl to coact with said wheels when said recesses are opposite said pawl, said governor having a plurality of stationary controlling positions, substantially as described.

22. In a numbering machine, a series of numbering wheels, a pawl coacting with the interiors of said wheels, a rotatable governor having a cam coacting with said pawl and controlling the position thereof, and a duplicator ring coacting with said governor and having alternate deep and shallow notches, the said deep notches permitting said pawl to coact with said wheels when the pawl is opposite said deep notches, said governor having a plurality of stationary controlling positions, substantially as described.

23. In a numbering machine, a series of numbering wheels, a pawl co-acting with said wheels, a rotatable governor controlling the action of said pawl, a duplicator ring having alternate deep and shallow notches, the said deep notches permitting the said pawl to co-act with said wheels, and means for giving said duplicator a step by step movement, substantially as described.

24. In a numbering machine, a series of numbering wheels, a pawl co-acting with said wheels, a rotatable governor controlling the action of said pawl, a duplicator ring having alternate deep and shallow notches, the said deep notches permitting the said pawl to co-act with said wheels, and a detent co-acting with said duplicator ring and giving it a step by step movement, substantially as described.

25. In a numbering machine, a series of numbering wheels, a pawl co-acting with said wheels, a rotatable governor controlling the action of said pawl, an exterior pawl co-acting with said governor to hold it in its proper position, a duplicator ring having alternate deep and shallow notches, the said deep notches permitting the said pawl to co-act with said wheels, and means for giving said duplicator a step by step movement, substantially as described.

26. In a numbering machine, a series of numbering wheels, a pawl co-acting with said wheels, a rotatable governor controlling the action of said pawl, a duplicator ring having alternate deep and shallow notches, the said deep notches permitting the said pawl to co-act with said wheels, and means for giving said duplicator a step by step movement, said governor having a cam movable against said pawl to hold it out of said deep notches in the duplicator, substantially as described.

27. In a numbering machine, a series of numbering wheels, a pawl co-acting with the interiors of said wheels, a rotatable governor controlling the action of said pawl, a duplicator ring having alternate deep and shallow notches, the said deep notches permitting the said pawl to co-act with said wheels, said governor having a plurality of stationary controlling positions and having a cam movable against said pawl to hold it out of the deep notches of the duplicator, and a second pawl coacting with said governor to hold it in its proper position, substantially as described.

28. In a numbering machine, a series of numbering wheels, a pawl co-acting with said wheels having no rotary movement but a slight oscillation on its axis, a rotatable governor comprising a ring having a cam co-acting with said pawl and controlling the position thereof, and a duplicator ring co-acting with said governing ring having recesses or notches permitting said pawl to co-act with said wheels when said recesses are opposite said pawl, substantially as described.

29. In a numbering machine, a series of numbering wheels, a pawl co-acting with said wheels having no rotary movement but a slight oscillation on its axis, a rotatable governor comprising a ring having a cam co-acting with said pawl and controlling the position of the same, and a duplicator ring co-acting with said governing ring having recesses or notches permitting said pawl to co-act with said wheels when said recesses are opposite said pawl, substantially as described.

30. In a numbering machine, a series of numbering wheels, a pawl co-acting with said wheels having no rotary movement but a slight oscillation on its axis, a rotatable governor comprising a ring having a cam co-acting with said pawl and controlling the position thereof, and a duplicator ring co-acting with said governing ring having alternate deep and shallow notches, the said deep notches permitting said pawl to co-act with said wheels when the pawl is opposite said deep notches, substantially as described.

31. In a numbering machine, a series of numbering wheels, a pawl co-acting with said wheels having no rotary movement but a slight oscillation on its axis, a rotatable governor controlling the action of said pawl, a duplicator ring having alternate deep and shallow notches, the said deep notches permitting the said pawl to co-act with said wheels, and a detent co-acting with said duplicator ring and giving it a step by step movement, substantially as described.

32. In a numbering machine, a series of numbering wheels, a pawl co-acting with said wheels having no rotary movement but a slight oscillation on its axis, a rotatable governor controlling the action of said pawl, a duplicator ring having alternate deep and shallow notches, the said deep notches permitting the said pawl to co-act with said wheels, said governor having a cam movable against said pawl to hold it out of the deep notches of the duplicator, and a second pawl co-acting with said governor to hold it in its proper position, substantially as described.

33. In a numbering machine, a series of numbering wheels, a pawl co-acting with said wheels, a rotatable governor controlling the action of said pawl, a duplicator ring having alternate deep and shallow notches, the said deep notches permitting the said pawl to co-act with said wheels, said duplicator ring also having interior ratchet teeth, and a detent co-acting with said ratchet teeth for giving the duplicator ring a step by step movement, substantially as described.

34. In a numbering machine, a series of numbering wheels, a pawl co-acting with said wheels, a rotatable governor controlling the action of said pawl, an exterior pawl co-acting with said governor to hold it in its proper position, a duplicator ring having alternate deep and shallow notches, the said deep notches permitting the said pawl to co-act with said wheels, said duplicator ring also having interior ratchet teeth, and a detent co-acting with said ratchet teeth for giving the duplicator ring a step by step movement, substantially as described.

35. In a numbering machine, a series of numbering wheels, a pawl co-acting with said wheels, a rotatable governor controlling the action of said pawl, a duplicator ring having alternate deep and shallow notches, the said deep notches permitting the said pawl to co-act with said wheels, said duplicator ring also having interior ratchet teeth, and a detent co-acting with said ratchet teeth for giving the duplicator ring a step by step movement, said governor having a cam movable against said pawl to hold it out of said deep notches in the duplicator, substantially as described.

36. In a numbering machine, a series of numbering wheels, a pawl co-acting with said wheels, a rotatable governor controlling the action of said pawl, a duplicator ring having alternate deep and shallow notches, the said deep notches permitting the said pawl to co-act with said wheels, said duplicator ring also having interior ratchet teeth, and a detent coacting with said ratchet teeth for giving the duplicator a step by step movement, said governor having a cam movable against said pawl to hold it out of the deep notches of the duplicator, and a second pawl co-acting with said governor to hold it in its proper position, substantially as described.

37. In a numbering machine, a series of numbering wheels, a governor and a duplicator arranged side by side and controlling the action of said wheels, and a pawl for locking said governor and duplicator together, substantially as described.

38. In a numbering machine, a series of numbering wheels, a governor and a duplicator arranged side by side and controlling the action of said wheels, and an exterior pawl for locking said governor and duplicator together, substantially as described.

39. In a numbering machine, a series of numbering wheels, a pawl co-acting with said wheels, a governor of rotary form controlling the action of said pawl, a duplicator ring having alternate deep and shallow notches in its interior surface, the said deep notches permitting the said pawl to co-act with said wheels, means for giving said duplicator a step by step movement, and means for locking said governor and duplicator together, substantially as described.

40. In a numbering machine, a series of numbering wheels, a governor and a duplicator, a pawl co-acting with said governor and duplicator to lock them together, one of said parts the governor or the duplicator having means for holding said pawl out of locking engagement with the other, substantially as described.

41. In a numbering machine, a series of numbering wheels, a governor and a duplicator, a pawl for locking said parts together, and projections on said governor whereby the pawl may be lifted out of locking engagement with said duplicator, substantially as described.

42. In a numbering machine, a series of numbering wheels, a governor and a duplicator ring, means for locking said rings together, and a projection on the governor arranged to move said locking means out of locking engagement with the duplicator ring, substantially as described.

43. In a numbering machine, a series of numbering wheels, a pawl, a governing ring and a duplicator ring, the duplicator ring having a series of deep recesses adapted to receive said pawl, and means for giving said duplicator ring a step by step movement, the duplicator ring holding down said pawl when it is not located in said recesses, substantially as described.

44. In a numbering machine, a series of numbering wheels, a pawl, a governing ring and a duplicator ring, the duplicator ring having a series of deep recesses adapted to receive the pawl and a series of interior ratchet teeth, and a detent co-acting with said ratchet teeth for giving said duplicator ring a step by step movement, the duplicator ring holding down said pawl when it is not located in said recesses, substantially as described.

45. In a numbering machine, a series of numbering wheels, a pawl, a governing ring and a duplicator ring, the duplicator ring having a series of deep recesses adapted to receive the pawl and a series of interior ratchet teeth, and a detent co-acting with said ratchet teeth for giving said duplicator ring a step by step movement, said governing ring having a cam holding said detent away from the ratchet teeth in said duplicator ring whereby the machine will print consecutively, substantially as described.

46. In a numbering machine, a series of numbering wheels, a pawl, a governing ring and a duplicator ring, means for locking said rings together, the duplicator ring having a series of deep recesses adapted to receive the pawl and a series of interior ratchet teeth, and a detent co-acting with said ratchet teeth for giving said duplicator ring a step by step movement, said governing ring having a cam holding said detent away from the ratchet teeth in said duplicator ring whereby the machine will print consecutively, substantially as described.

47. In a numbering machine, a series of numbering wheels, a pawl, a governing ring and a duplicator ring, a pawl for locking said rings together, the duplicator ring having a series of deep recesses adapted to receive the first mentioned pawl and a series of interior ratchet teeth, and a detent co-acting with said ratchet teeth for giving said duplicator ring a step by step movement, said governing ring having a cam holding said detent away from the ratchet teeth in said duplicator ring whereby the machine will print consecutively, substantially as described.

48. In a numbering machine, a series of numbering wheels, a pawl, a governing ring and a duplicator ring, a pawl for locking said rings together, a projection on one of said rings for moving said locking pawl out of locking engagement when one of said rings is moved with respect to the other, the duplicator ring having a series of deep recesses adapted to receive the first mentioned pawl and a series of interior ratchet teeth, and a detent co-acting with said ratchet teeth for giving said duplicator ring a step by step movement, said governing ring having a cam holding said detent away from the ratchet teeth in said duplicator ring whereby the machine will print consecutively, substantially as described.

49. In a numbering machine, a series of numbering wheels, a pawl, a governing ring and a duplicator ring, the duplicator ring having exterior grooves and the governing ring having an exterior groove and a projection, an exterior pawl adapted to fit in said grooves and lock the rings together and the projection on the governing ring being adapted to lift said pawl out of the grooves of said duplicator ring, the duplicator ring having a series of deep recesses adapted to receive the first mentioned pawl and a series of interior ratchet teeth, and a detent co-acting with said ratchet teeth for giving said duplicator ring a step by step movement, said governing ring having a cam holding said detent away from the ratchet teeth in said duplicator ring whereby the machine will print consecutively, substantially as described.

50. In a numbering machine, a series of numbering wheels, an interior pawl adapted to coöperate with said wheels and substantially non-shiftable in a direction parallel to the axis of the wheels, and a duplicator ring having a series of deep notches permitting said pawl to engage said numbering wheels when the pawl is located in any of said notches, substantially as described.

51. In a numbering machine, a series of numbering wheels, a pawl co-acting with said wheels, a duplicator ring having a series of deep notches permitting said pawl to engage said numbering wheels when the pawl is located in any of said notches and a series of ratchet teeth, and a detent co-acting with said ratchet teeth for giving the duplicator ring a step by step movement, substantially as described.

52. In a numbering machine, a series of numbering wheels, a pawl co-acting with said wheels, a duplicator ring having a series of deep notches permitting said pawl to engage said numbering wheels when the pawl is located in any of said notches, and means for giving said duplicator ring a step by step movement, substantially as described.

53. In a numbering machine, a series of numbering wheels, an interior pawl adapted to coact with said wheels and substantially non-shiftable in a direction parallel to the axis of the wheels, and a duplicator ring having alternate deep and shallow notches, the deep notches permitting said pawl to engage said numbering wheels and the shallow notches holding said pawl away from said wheels, substantially as described.

54. In a numbering machine, a series of numbering wheels, a pawl co-acting with said wheels, a duplicator ring having alternate deep and shallow notches, the deep notches permitting said pawl to engage said numbering wheels and the shallow notches holding said pawl away from said wheels, and a detent for giving said duplicator ring a step by step movement, substantially as described.

55. In a numbering machine, a series of numbering wheels, a pawl co-acting with said wheels, a duplicator ring having alternate deep and shallow notches, the deep notches permitting said pawl to engage said numbering wheels and the shallow notches holding said pawl away from said wheels, said duplicator ring also having a series of ratchet teeth, and a detent co-acting with said teeth to give said ring a step by step movement, substantially as described.

56. In a numbering machine, a series of numbering wheels, a pawl co-acting with said wheels, a duplicator ring having alternate deep and shallow notches, the deep notches permitting said pawl to engage said numbering wheels and the shallow notches holding said pawl away from said wheels, said duplicator ring also having a series of ratchet teeth, a detent coacting with said teeth to give said ring a step by step movement, and a governor arranged to hold said pawl out of said deep notches, substantially as described.

57. In a numbering machine, a series of numbering wheels, a pawl co-acting with said wheels, a duplicator ring having alternate deep and shallow notches, the deep notches permitting said pawl to engage said numbering wheels and the shallow notches holding said pawl away from said wheels, said duplicator ring also having a series of ratchet teeth, a detent co-acting with said teeth to give said ring a step by step movement, and a governor arranged to hold said pawl out of said deep notches, substantially as described.

58. In a numbering machine, a series of numbering wheels, an interior pawl coacting with said wheels and substantially non-shiftable on its axis, a duplicator and a governor, and two steps on said pawl, one co-acting with the duplicator and the other with the governor, substantially as described.

59. In a numbering machine, a series of numbering wheels, an interior pawl coacting with said wheels and substantially non-shiftable on its axis, two steps on said pawl, a duplicator ring having deep notches permitting said pawl to engage said wheels when one of its steps is in one of said deep notches, and a governor co-acting with the other step on the pawl and arranged to hold said pawl out of contact with the wheels, substantially as described.

60. In a numbering machine, a series of numbering wheels, an interior pawl coacting with said wheels and substantially non-shiftable on its axis, two steps on said pawl, a duplicator ring having deep notches permitting said pawl to engage said wheels when one of its steps is in one of said deep notches, and a governor having a cam co-acting with the other step on the pawl and arranged to hold said pawl out of contact with the wheels, substantially as described.

61. In a numbering machine, a series of numbering wheels, a pawl co-acting with said wheels, two steps on said pawl, a duplicator ring having deep notches permitting said pawl to co-act with said wheels when one of its steps is in any of said deep notches, ratchet teeth on said duplicator ring, and a detent co-acting with said ratchet teeth giving a step by step motion to said duplicator ring, substantially as described.

62. In a numbering machine, a series of numbering wheels, a pawl co-acting with said wheels, two steps on said pawl, a duplicator ring having deep notches permitting said pawl to co-act with said wheels when one of its steps is in any of said deep notches, ratchet teeth on said duplicator ring, a detent co-acting with said ratchet teeth giving a step by step motion to said duplicator ring, and a governor ring co-acting with the other step on said pawl and arranged to hold the same away from said wheels, substantially as described.

63. In a numbering machine, a series of numbering wheels, a pawl co-acting with said wheels, two steps on said pawl, a duplicator ring having deep notches permitting said pawl to co-act with said wheels when one of its steps is in any of said deep notches, ratchet teeth on said duplicator ring, a detent co-acting with said ratchet teeth giving a step by step motion to said duplicator ring, and a governor ring having two cams and movable to bring one cam over one of the steps on said pawl to hold the same away from said wheels and also movable to bring the other cam over said detent, substantially as described.

64. In a numbering machine, a series of numbering wheels, a pawl bar coacting with said wheels, a detent, and a governor ring having two cams and movable to bring one cam over the pawl bar to hold its pawls away from said wheels and also movable to bring the other cam over the detent to depress the same, substantially as described.

65. In a numbering machine, a barrel, numbering wheels rotating thereon, a duplicator and a governor alongside of said numbering wheels, said duplicator having a series of deep notches and a series of ratchet teeth, the deep notches permitting the pawl to engage said wheels, a detent engaging said ratchet teeth and giving said duplicator a step by step movement, and a governor movable with respect to said duplicator ring and having two cams thereon, one cam engaging the pawl to move it out of contact with said wheels and the other cam engaging the detent to move it out of engagement with said ratchet teeth, substantially as described.

66. In a numbering machine, a barrel, numbering wheels rotating thereon, a duplicator and a governor alongside of said numbering wheels, said duplicator having a series of deep notches and a series of ratchet teeth, the deep notches permitting the pawl to engage said wheels, a detent engaging said ratchet teeth and giving said duplicator a step by step movement, a governor movable with respect to said duplicator ring and having two cams thereon, one cam engaging the pawl to move it out of contact with said wheels and the other cam engaging the detent to move it out of engagement with said ratchet teeth, and an exterior pawl for holding said governor in positions of adjustment, substantially as described.

67. In a numbering machine, a barrel or support, numbering wheels rotating thereon, and means carried by said barrel for moving said wheels, means for oscillating the said barrel, and a resilient connection between said barrel and said means for oscillating the said barrel, substantially as described.

68. In a numbering machine, a barrel or support, numbering wheels carried thereon, operating mechanism for oscillating the barrel, and a resilient connection between said operating mechanism and said barrel or support, substantially as described.

69. In a numbering machine, a barrel or support, numbering wheels carried thereon, operating mechanism for said barrel, and a resilient connection between said operating mechanism and said barrel or support, said resilient connection comprising a crank having a spring rod projecting from an opening larger than itself, substantially as described.

70. In a numbering machine, a barrel or support for numbering wheels, an axle extended through said barrel or support, and a resilient connection between said axle and said barrel or support, comprising a crank fixedly secured to said axle and a spring pin extending substantially parallel to said axle and into said barrel or support and having one end secured to said crank and the other end secured to said barrel or support, a portion of said pin intermediate its ends being free to flex, substantially as described.

71. In a numbering machine, a barrel or support having a longitudinal opening or groove, numbering wheels carried by said barrel or support, a pawl bar operating in said groove, an axle, and a resilient connection between said axle and said barrel or support, substantially as described.

72. In a numbering machine, a barrel or support having a longitudinal opening or groove, numbering wheels carried by said barrel or support, a pawl bar operating in said groove, an axle, and a resilient connection between said axle and said barrel or support comprising a crank projecting from said axle and a spring rod projecting from said crank into an opening in the barrel or support, substantially as described.

73. In a device of the character described, a yoke or frame, a barrel carrying numbering wheels supported in said frame, slots in the sides of said frame leading into enlarged openings, journals from said barrel or support projecting through said enlarged openings, and a bushing inserted over said journals and projecting into the enlarged openings in said side frames, substantially as described.

74. In a numbering machine, a barrel and numbering wheels, side frames forming a support therefor having enlarged openings and slots leading therefrom, the journals from said barrel being inserted through said slots and into said openings, and bushings in the openings around said journals preventing the withdrawal of said journals through said slots, substantially as described.

75. In a numbering machine, the combination of an inking pad frame, a frame to which it is pivotally connected, printing means carried thereby, and operating means for said pad frame to move the same into inking and non-inking positions, said pad frame being gravity actuated to swing into coöperative relation with said operating means when the machine is in printing position, and capable of swinging by gravity entirely free from said operating means when the machine is out of printing position, substantially as described.

76. The combination of a frame carrying printing means, an inking pad frame pivoted thereto, and an operating member having a cam and moving the said pad frame when said operating member is moved and having a recess into which part of the pad frame fits, substantially as described.

77. The combination of a frame carrying printing means, an inking pad frame pivoted thereto and movable to and from said means, and an operating member movable with respect to said frame and having a cam moving the pad frame away from the printing means when said member is moved in one direction and a recessed portion receiving part of the pad frame and moving the pad frame against the printing means when said member is moved in the opposite direction, substantially as described.

78. The combination of a reciprocatory frame carrying printing means, a pivotally supported inking pad frame, and a movable member operating said printing means, said member being controlled in position by the reciprocatory frame and said printing pad frame being operated directly by the movement of said movable member, substantially as described.

79. The combination of a reciprocatory frame carrying printing means, a pivotally supported inking pad frame, and a movable member operating said printing means and having a cam moving the inking pad frame away from said printing means as said member is moved, said member being controlled in position by the reciprocatory frame, substantially as described.

80. The combination of a frame carrying printing means, a pivotally supported inking pad frame movable to and from said means, and a movable member operating said printing means and having a cam and a recessed portion each adapted to engage said pad frame, said cam moving the pad frame away from the printing means as said member is moved in one direction and the recessed portion receiving a part of the pad frame and moving said frame against the printing means when said member is moved in the opposite direction, substantially as described.

81. The combination of a main frame, a wheel frame movable therein and carrying printing means, an inking pad frame pivoted to said wheel frame and movable to and from said printing means, an operating member carried by said wheel frame and pivotally connected to said main frame whereby said operating member operates the printing means as said wheel frame is moved in said main frame, and said operating member directly operating said inking pad frame, substantially as described.

82. The combination of a main frame, a wheel frame movable therein and carrying printing means, an inking pad frame pivoted to said wheel frame and movable to and from said printing means, an operating member carried by said wheel frame and pivotally connected to said main frame whereby said operating member operates the printing means as said wheel frame is moved in said main frame, said operating member having a cam moving the pad frame as it operates the printing means, substantially as described.

83. In a numbering machine, a main frame, a frame carrying printing means and mounted for reciprocatory movement in the main frame and spring-pressed into non-printing position, a frame carrying an inking pad and pivotally mounted upon the reciprocatory frame, operating means for engaging said inking pad frame to move the pad into and out of inking position during movement of the reciprocatory frame, said inking pad frame being movable by gravity entirely out of engagement with said operating means when the machine is inverted and the reciprocatory frame is slightly displaced from its spring-pressed position, substantially as described.

This specification signed and witnessed this 4th day of October, 1900.

LOUIS K. SCOTFORD.

Witnesses:
ARTHUR S. AGNEW,
FRIDA M. BIELENBERG.

Copies of this patent may be obtained for five cents each, by addressing the "Commissioner of Patents. Washington, D. C."